Patented July 23, 1935

2,008,999

UNITED STATES PATENT OFFICE 2,008,999

METHOD OF PRODUCING PECTIN PREPARATIONS

Leo Wallerstein, New York, N. Y., assignor to Wallerstein Company, Inc., New York, N. Y., a corporation of New York No Drawing. Application July 13, 1928, Serial No. 292,608

18 Claims. (Cl. 99—11)

This invention relates to a method of producing pectin preparations of a high jellying power suitable for the production of jams and jellies and other purposes for which such pectin preparations may be employed, and to a pectin preparation produced by the method.

Pectin preparations prepared from pectin containing substance such as apple pomace, citrus fruit peels, beet pulp, etc. have been prepared by extracting the soluble pectin contained therein by various extraction methods, as by the use of boiling water, or by boiling with water under pressure, or by boiling with very dilute solutions of organic acids, or by boiling with salt or sugar solutions. Such methods, however, are difficult to control and have many disadvantages and the resulting solutions often contain undesirable substances, for instance, in the case of apple pomace as a starting material gelatinous starch, which make them difficult to filter and clarify.

In accordance with the invention, pectin preparations of a very high jellying power can be easily obtained from the above mentioned raw materials by treating such raw materials at comparatively moderate temperature with a solution of a strong inorganic acid under such conditions of time or duration of treatment and temperature that the jellying power of the resulting pectin preparation is not substantially impaired and a pectin preparation, either in liquid form or a dried preparation, can be obtained.

Various inorganic acids may be used for a digesting and extracting treatment of the raw material, such as sulphuric acid, hydrochloric acid and nitric acid, the digestion and extraction being effected at moderate temperatures and under proper conditions hereinafter referred to. The concentration of the acid in the treating solution may be subject to wide variations provided the temperature and duration of treatment are properly regulated. I have found that the higher the concentration of the acid solution, that is, the higher the acidity the lower the temperature should be during the digestion and extraction, and further that the higher the temperature and the higher the acidity of the treating solution the shorter the time should be during which the solution is allowed to act.

It is important that during the digesting and extracting treatment the hydrolysis of the pectin containing substances should be carefully and definitely controlled. If the hydrolysis has proceeded so far that a pectin preparation may be precipitated with a calcium chloride solution as hereinafter referred to at a pH below 2, the precipitated product is one whose jellying power is comparatively low, and which is nearly insoluble in a weak organic acid solution. The liquid pectin extract has also unsatisfactory jellying power, although apparently containing much substances derived from the pectin in the raw material. The precipitated material in this case is similar to pectic acid in its properties. On the other hand, if the hydrolysis has not proceeded sufficiently so that a product will precipitate with $CaCl_2$ substantially only at a pH above 8, the process is unsatisfactory on account of the yield being too low. The pectin extract under these conditions contains pectinous substances of good jellying power but in small quantities only.

The precipitates with $CaCl_2$ at this pH are unsatisfactory in jellying power, probably due to changes in the pectinous substance occurring when brought to such a high pH. By controlling the digestion and extraction treatment, however, so that products will be substantially precipitated by $CaCl_2$ solutions between a pH of 3 and 7, such products will be of very high jellying power and in good yield. The pectin solutions resulting from the process are free from starch and can be readily filtered and clarified, and produced in the desired commercial form, either liquid or dried.

As an example of carrying out my process, I may proceed as follows: 100 lbs. of dried apple pomace are digested with 75 gallons of 0.1 normal sulphuric acid at a temperature of 60° C. for about 40 hours. The N/10 solution of sulphuric acid before addition to the pomace had a pH of 1.2 and the mixture of pomace and N/10 sulphuric acid had a pH of about 1.5. This last pH is maintained substantially constant throughout the digestion. The content of the solution in pectinous substances of high jellying power and accordingly the jellying power of the extract increase to a certain point; then the jellying power of the extract decreases again on account of the decrease of the jellying power in the dissolved pectinous substances. The proper time or duration for digestion and extraction of the pectin can be easily determined by precipitating from time to time samples of the digesting liquor so dissolved and testing same for the jellying power. For making the test a preferably filtered sample of the pectin extract is brought to the mentioned pH by the addition of any suitable neutralizing agent such as $NaHCO_3$, for instance, and by the addition of a calcium chloride solution the sample is tested as described. When the digestion has proceeded to the proper point, using the above described acid strength in the solution and at a temperature of about 60° C., which will be after about 40 hours, the liquid is brought to a pH of 3 to 7 and separated from the solid residue by pressing or otherwise. Any suitable neutralizing agent may be used for this purpose, as for instance sodium bicarbonate or sodium carbonate, and the separated liquid is preferably filtered.

The pectin preparation produced from this process is free from starch and is preferably then treated for the preparation of a pectin material, either in a liquid form by any evaporation or concentration method, or a solid pectin by any precipitation method, for instance, by precipitating same with alcohol.

I have discovered, however, that pectin containing liquors produced in accordance with the described method can be treated to purify and concentrate them by precipitating out the pectin substances with a soluble salt of an alkaline earth, such as calcium chloride, or by a salt of aluminum. Such treatment permits a simple and economic separation of the jelly forming substances from a large part of the impurities contained in the solution, such as sugars, salts, and coloring matter, etc., and at the same time brings about the concentration of the jelly forming substances and the resulting precipitate can then be treated in various ways, either to produce a liquid product or a dried product.

In thus treating the pectin containing liquor, such liquor may be produced either as above described or, if desired, as follows:

As an example, 200 lbs. of apple pomace are digested with an acid solution made by dissolving 6.4 lbs. of sulphuric acid and 1200 lbs. of water, and digestion and extraction are permitted to take place at 62° C., preferably with occasional stirring for approximately 36 to 40 hours, that is, until a point is reached at which the pectin substances in a test sample will be precipitated by a solution of a salt of alkaline earth, such as calcium chloride, at a pH of 4 to 7. When this point is reached, further hydrolysis is stopped by neutralizing the solution to a pH of 4 to 7, and this neutralization is effected by the addition of sodium carbonate or bicarbonate, or any other suitable neutralizing agent. The liquor may, prior to neutralization, be separated from the solids by decantation and pressing out and is then filtered, and the pectin substances contained in the neutralized and filtered digestion liquor of a pH of 4.0 to 7.0 are precipitated by adding thereto a sufficient amount of soluble salt of the alkaline earth, as for instance, calcium chloride. The quantity of such salt added should be such that any excess of the salt does not give a further precipitation.

The precipitated material is then separated from the liquor by any desired means, as for instance by filtering, and the precipitate is pressed and washed. This precipitate may be treated to prepare either a liquid pectin preparation of high concentration or a solid pectin preparation.

If it is desired to produce a dried or solid pectin, the precipitate, which is preferably washed to eliminate soluble lime salts and impurities, is pressed out in an ordinary press or in a hydraulic press to remove as much as possible of the adhering water and is then carefully dried and ground. If desired, the pressed precipitate can also be treated with alcohol, again pressed and dried. This treatment with alcohol changes the gelatinous character of the precipitate, permitting a thorough pressing and a comparatively quick drying.

If it be desired to make a concentrated liquid pectin preparation, the pressed precipitate can be brought back into the form of a solution by the use of a suitable organic acid, as for instance by dissolving it in water containing tartaric or citric acid. This produces a concentrated pectin solution which can be simply prepared without any evaporation.

It will be understood that many variations may be made in the process and in the treatment of the pectin substance produced by the process as set forth in the examples given. For instance, if the digestion and extraction treatment is carried out at a higher temperature, as for instance 74° C., similar results may be obtained by shortening the time of digestion to from 20 to 24 hours. A high acid concentration for the digestion and extraction may also be used, as for instance 0.2 normal, in which case the temperature should not exceed from 50 to 54° C. The N/5 sulphuric acid solution had a pH of 1.0 and after mixture with the pomace had a pH of about 1.1. This last pH is maintained substantially constant throughout the digestion. The hydrolysis, furthermore, need not necessarily be stopped at the point where the precipitation takes place at a pH of 4 to 7, but might be continued somewhat longer, as for instance until a precipitation at a pH of 3 occurs.

In utilizing the above-referred to acids, namely, sulphuric acid, hydrochloric acid, and nitric acid, in either N/5 or N/10 concentration with apple pomace, beet waste, and/or orange peels it was found that the pH value of the extraction mixture varied from 0.7 to 2.2.

For example, when 20 parts by weight of apple pomace, beet waste, or orange peels are respectively digested with about 120 parts by weight of the N/5 or N/10 acid and the mixture is kept at 60° for one hour, then strained and cooled to room temperature (60° F.) the pH will vary as apparent from the below tabulation.

In the following tabulation the results were obtained within the range of 0.1 pH which is approximately the limit of the accuracy. The pH of the nitric acid solution was determined with a glass electrode, while the pH of the sulphuric and hydrochloric acids was determined with a quinhydron electrode.

| Acid | Apple pomace | Beet waste | Orange peel |
| --- | --- | --- | --- |
| N/5 H$_2$SO$_4$ | 1.1–1.2 | 1.3–1.4 | 1.1–1.2 |
| N/10 H$_2$SO$_4$ | 1.5–1.6 | 2.0–2.1 | 1.5 |
| N/5 HCl | 0.9–1.0 | 1.1–1.2 | 0.9–1.0 |
| N/10 HCl | 1.3–1.4 | 2.1–2.2 | 1.3–1.4 |
| N/5 HNO$_3$ | 0.7–0.8 | 0.9–1.0 | 0.7–0.8 |
| N/10 HNO$_3$ | 1.1–1.2 | 1.9 | 1.1–1.2 |

A pectin substance resulting from the above process appears to be one having characteristics which differ from known pectins. This product is probably a pectin somewhere between the highest methoxylated pectin and pectic acid and can be precipitated as soon as it is formed by the addition of soluble salts of the alkaline earth at a pH of 3 to 7, and such precipitation has high jellying properties.

What I claim is:

1. The method of producing pectin preparations of high jellying power, which consists in digesting a raw material containing a substance yielding pectin with a solution of a strong inorganic acid at a temperature of about 60° C. until the pectin substance will precipitate by the addition of soluble calcium salt at a pH of from 3 to 7, neutralizing the solution to a pH of from 3 to 7, and freeing the liquid from the solids.

2. The method of producing pectin preparations of high jellying power, which consists in digesting a raw material containing a substance yielding pectin with a solution of sulphuric acid at a temperature of about 60° C. until the pectin substance will precipitate by the addition of calcium chloride at a pH of from 3 to 7, neutralizing the solution to a pH of from 3 to 7, and freeing the liquid from the solids.

3. The method of producing pectin preparations of high jellying power, which consists in digesting a raw material containing a substance yielding pectin with a solution of a strong inorganic acid, maintaining the hydrolysis until pectin products will precipitate from the solution at a pH of from 3 to 7 by the addition of CaCl₂, neutralizing the solution to a pH of from 3 to 7, and precipitating pectin containing products by a soluble salt of an alkaline earth.

4. The method of producing pectin preparations of high jellying power, which consists in digesting a raw material containing a substance yielding pectin with a solution of a strong inorganic acid, maintaining the hydrolysis until pectin products will be precipitated from the solution by CaCl₂ at a pH of from 3 to 7, neutralizing the solution to a pH of from 3 to 7, separating the liquid portion, and precipitating pectin containing products with calcium chloride.

5. The method of producing pectin preparations of commercially satisfactory jellying power which comprises digesting a pectin containing material with a solution of a relatively strong inorganic acid at a pH of between about 0.7 and 2.2 and at a temperature substantially above room temperature but substantially below boiling to extract the pectin material from said raw material and stopping the reaction before substantial quantities of pectic acid are formed, said acid being of such a character as to maintain a substantially constant pH throughout the digestion.

6. The process of producing pectin of commercially satisfactory jellying power which comprises digesting a pectin containing material with a solution of a strong mineral acid at a pH of between about 0.7 and 2.2 and at a temperature substantially above room temperature but substantially below boiling and continuing the digestion until a pectin is formed which will precipitate with calcium chloride at a pH of between 3 and 7 but stopping the reaction short of the point at which substantial quantities of pectic acid will be formed, said acid being of such a character as to maintain a substantially constant pH throughout the digestion.

7. A process of preparing pectin of commercially satisfactory jellying power which comprises digesting a pectin containing material with a solution of a strong mineral acid of such strength and concentration as to produce a pH of between about 0.7 and 2.2 in the mixture, said acid being of such a character as to maintain a substantially constant pH throughout the digestion.

8. A process of producing a pectin of commercially satisfactory jellying power which comprises digesting a pectin containing material with a solution of a strong acid at a pH of between about 0.7 and 2.2 and at a temperature of between about 50° to 75° C. and for a period of time ranging from about 20 hours to 40 hours, the shorter length of time and lower temperature being utilized with increased acid concentration and the longer length of time and higher temperature being utilized with decreased acid concentration, said acid being of such a character as to maintain a substantially constant pH throughout the digestion.

9. The process of preparing a pectin of commercially satisfactory jellying power which comprises digesting a pectin containing material with a solution of a mineral acid of such concentration as to produce a pH of between about 0.7 and 2.2 during the digestion, continuing the digestion for a period ranging from ½ to 2 days at a temperature substantially above room temperature and substantially below boiling, stopping the digestion by reducing the acidity and then recovering the pectin, said acid being of such a character as to maintain a substantially constant pH throughout the digestion.

10. The process of preparing a pectin of commercially satisfactory jellying power which comprises digesting a pectin containing material with a solution of a mineral acid of such concentration as to produce a pH of between about 0.7 and 2.2 during the digestion, continuing the digestion for a period ranging from ½ to 2 days at a temperature substantially above room temperature and substantially below boiling, reducing the acidity, substantially concentrating the pectin by evaporation and then precipitating the pectin with alcohol, said acid being of such a character as to maintain a substantially constant pH throughout the digestion.

11. The process of preparing a pectin of commercially satisfactory jellying power which comprises digesting a pectin containing material with a solution of a mineral acid of such concentration as to produce a pH of between about 0.7 and 2.2 during the digestion, continuing the digestion for a period ranging from ½ to 2 days at a temperature substantially above room temperature and substantially below boiling, reducing the acidity to pH 3 to 7 and then precipitating the pectin with a soluble calcium salt, said acid being of such a character as to maintain a substantially constant pH throughout the digestion.

12. The process of preparing pectin of commercially satisfactory jellying power which comprises digesting apple pomace with a solution of sulphuric acid for a period of from 20 to 40 hours and of such concentration as to produce a pH of about between 0.7 and 2.2 during the digestion, and stopping the digestion when it is possible to precipitate a calcium compound of the pectin at a pH from 3 to 7.

13. In a process of extracting pectin from cellulosic materials, the step of digesting cellulosic material with an aqueous solution having a pH of between 1.0 and 1.9.

14. In a process of extracting pectin from cellulosic materials, the step of digesting a cellulosic material with an aqueous solution having a pH of between 1.2 and 1.9.

15. In a process of extracting pectin from cellulosic materials, the step of extracting pectin from cellulosic materials with an aqueous solution having a pH of between 1.0 and 1.9.

16. In a process of extracting pectin from cellulosic materials, the step of extracting pectin from cellulosic material under acid conditions with an aqueous solution having a pH of between 1.2 and 1.9.

17. In a process of extracting pectin from cellulosic materials, the step of extracting pectin from cellulosic material with an aqueous solution containing a monobasic acid, and having a pH of between 1.0 and 1.9.

18. In a process of extracting pectin from pectin-containing materials, the step of extracting the pectin from said materials with an acidic aqueous solution having a pH between 0.7 and 2.2.

LEO WALLERSTEIN.